United States Patent [19]
Kristy

[11] Patent Number: 5,603,479
[45] Date of Patent: Feb. 18, 1997

[54] BOTTLE HOLDER WITH FRANGIBLE JOINT

[76] Inventor: Andrew W. Kristy, 381 Quill Dr., NW., Cleveland, Tenn. 37311-8148

[21] Appl. No.: 506,854

[22] Filed: Jul. 25, 1995

[51] Int. Cl.⁶ ................................................. F16M 13/00
[52] U.S. Cl. .......................... 248/548; 248/104; 248/106; 248/900; 403/2
[58] Field of Search .................................. 248/102, 103, 248/104, 106, 548, 900; 403/2

[56] References Cited

U.S. PATENT DOCUMENTS 5,484,217   1/1996   Carroll et al. ............................... 403/2

*Primary Examiner*—Ramon O. Ramirez
*Assistant Examiner*—Michael J. Turgeon
*Attorney, Agent, or Firm*—Terrance L. Siemens

[57] ABSTRACT

A bottle holder for an automobile. The bottle holder includes a cradle or similar structure for securing a bottle in a predetermined position, a clamp for securing the bottle holder inside the automobile, and a partially rigid neck connecting the clamp to the cradle. The neck includes a frangible joint which shears in the event of a collision. The cradle and bottle are thereby no longer bound near the feeding child. The frangible joint preferably comprises a prescored tube, which breaks along a predetermined circumferential inscribed line in a collision. The frangible joint is manually removable and installable to the neck, so that it can be renewed should it break. Optionally, a flaccid tether is provided to restrain the freed cradle and bottle from being thrown uncontrollably about the automobile cabin.

7 Claims, 2 Drawing Sheets

5,603,479

BOTTLE HOLDER WITH FRANGIBLE JOINT

BACKGROUND OF THE INVENTION

1. Field of the Invention

The present invention relates to a tether for securing a bottle in place when in use. The tether is partially rigid, in that it maintains its configuration, but is easily deformable by hand for reconfiguration. The tether maintains a bottle in a desired position, as for example, in a location readily accessible to a small child in an automobile. The tether clamps to an environmental surface, such as a child seat, and includes a frangible section which ruptures in the event of a collision. This feature assists in preventing the bottle from aggravating injury due to violent movement induced during the collision.

2. Description of the Prior Art

Bottle holders of the partially rigid type are well known in the art. Bottle holders are generally intended for holding a feeding bottle in close proximity to an infant or small child in a readily accessible location. Typically, the holder comprises apparatus for securement to an environmental surface, a partially rigid neck or tether, and apparatus for releasably grasping the bottle. The partially rigid neck is rigid in the sense that it maintains a form, but readily deformable by hand for reconfiguration. Such necks are widely employed for lamps, and conventionally comprise a tube formed from a spiralled metal strip.

U.S. Pat. Nos. 4,114,847, issued to Joseph Bogensberger on Sep. 19, 1978, and 5,192,041, issued to Sheree M. Bryant on Mar. 9, 1993, exemplify bottle holders. Both examples include a clamp or suction cup, or both, for engaging an environmental surface. Both include a partially rigid neck or tether, and apparatus for securing the bottle on the neck.

The above patents are more relevant to use when transporting a child in an automobile. U.S. Pat. Nos. 3,425,653, issued to William Rauch on Feb. 4, 1969, and 4,733,836, issued to Robert J. Barnes on Mar. 29, 1988, both illustrate bottle holders for children, but apparatus for mounting in the latter two cases is less suited for automobile environments.

Regardless of the mounting, the prior art has generally failed to consider implications regarding safety in the event of a collision. Inertial and other forces may cause the mass of a bottle to swing about rapidly. The bottle thus threatens to become injurious, simply as a mass able to inflict blunt force trauma, or as a source of sharp shards of glass or like material should it break. Thus, unlike the present invention, the prior art has failed to provide means for mitigating potentially injurious motion of the bottle and its holder in the event of collision.

None of the above inventions and patents, taken either singly or in combination, is seen to describe the instant invention as claimed.

SUMMARY OF THE INVENTION

The present invention addresses the need for safety in the event of a collision when a bottle holder is employed in an automobile or other mobile form of transport. A frangible joint formed in the neck of the bottle holder is provided, so that in the event of a violent collision, the bottle cannot swing about in the manner of a whip. Also, a flaccid, flexible tether is optionally provided to prevent the freed end of the bottle holder from flying about within an automobile after the frangible joint breaks.

The frangible joint comprises a short section of tube having a prescored or otherwise weakened central section. The central section breaks into two pieces upon being subjected to a stress which would arise during a collision. Breakage results in a clean, neat fracture free of sharp splinters and shards, so that the frangible joint does not present further injurious hazards should it break.

The central section threads to cooperating threaded sockets formed in the partially rigid neck, so that it is easily replaced in the event of unintended breakage.

A screw clamp attaches the bottle holder to a convenient environmental surface, such as to a child seat, or to part of the automobile. A feeding bottle is grasped in any suitable manner, such as by spring-type contraction of a metallic collar, or is secured within a saddle by straps.

Accordingly, it is a principal object of the invention to provide a bottle holder for an automobile which releases the bottle in the event of a collision.

It is another object of the invention that the bottle holder have a dedicated component which is designed to break in the event of a collision.

It is a further object of the invention that the dedicated frangible component be replaceable.

Still another object of the invention is to tether the bottle holder such that after breakage of the frangible component, the bottle is restrained from flying about the automobile.

Yet another object of the invention is that the frangible joint not form splinters and similar sharp projections in the event of breakage thereof.

An additional object of the invention is that the bottle holder be releasably attachable to an environmental surface within the automobile.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
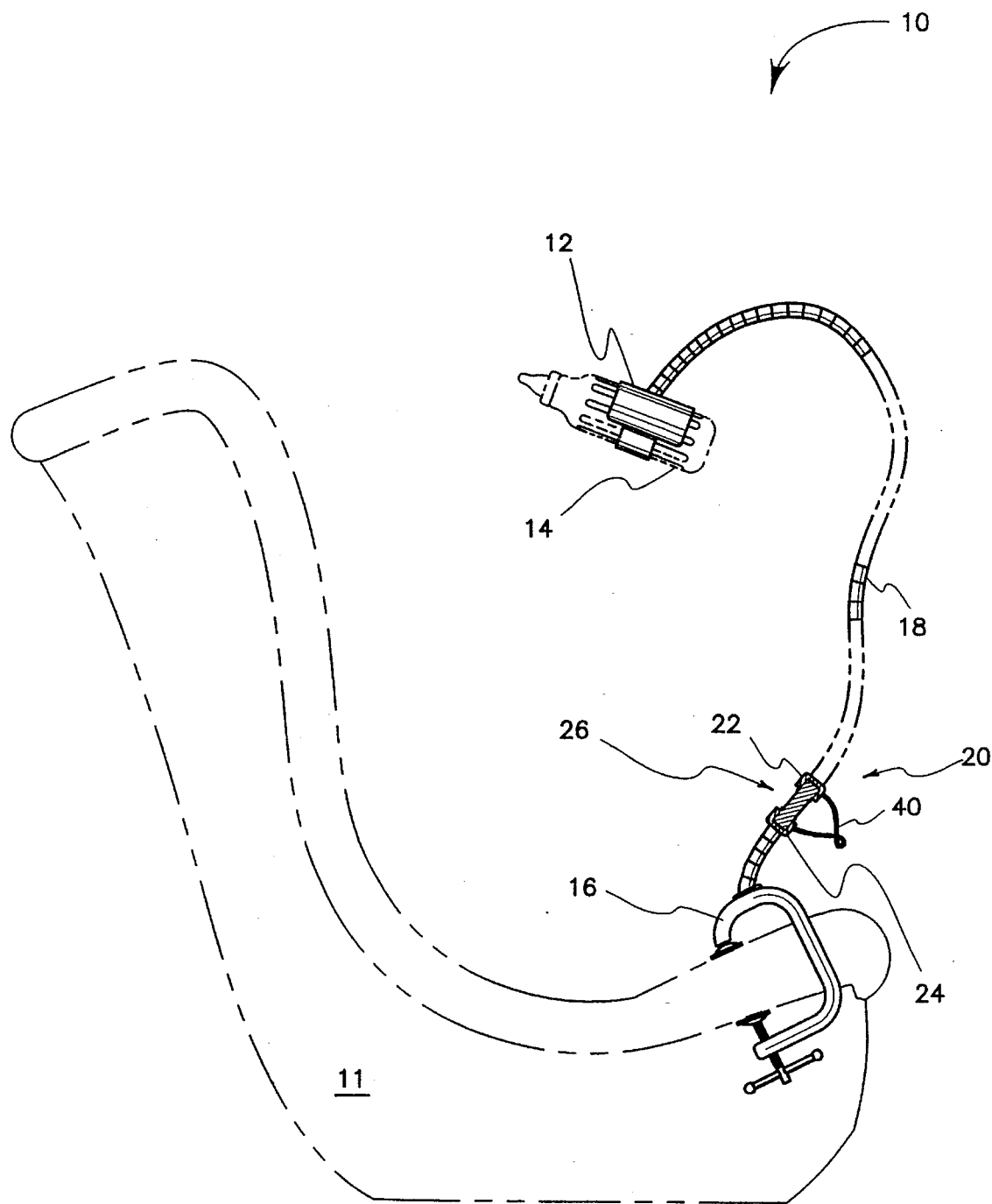
FIG. 1 is an environmental, side elevational view of the invention, with the novel frangible joint shown partially in cross section.

Turning now to FIG. 1 of the drawings, novel bottle holder 10 is shown attached to a car seat 11 for a child, and is seen to comprise a cradle 12 for cradling a feeding bottle 14, a clamp 16 for securing bottle holder 10 within the cabin of an automobile (not shown), and an elongated neck 18 connecting cradle 12 to clamp 16. Bottle holder 10 is intended to position bottle 14 proximate and accessible to a feeding child (not shown).

Cradle 12 and clamp 16 are representative of, respectively, any suitable attachment device for securing bottle 14 to bottle holder 10, and any suitable device releasably securing bottle holder 10 to an environmental surface. These components are not critical, the critical improvement being frangible joint 20 formed serially within bottle holder 10. The preferred location is serially within neck 18.

Neck 18 is partially rigid, so that bottle 14 is normally maintained in a desired position proximate the child. It would be possible that neck 18 be fully rigid, in the sense that it is not deformable by hand pressure, if bottle holder were designed to cooperate with a particular child seat 11, or other environmental component. Frangible joint 20 accounts for a portion of the length of neck 18, there being a remaining length of neck 18.

Frangible joint 20 preferably comprises sockets 22,24 located at respective opposing ends of the two sections of the remaining length of neck 18. Sockets 22,24 are threaded to accept a tubular frangible element, or tube 26.

Figure 2:
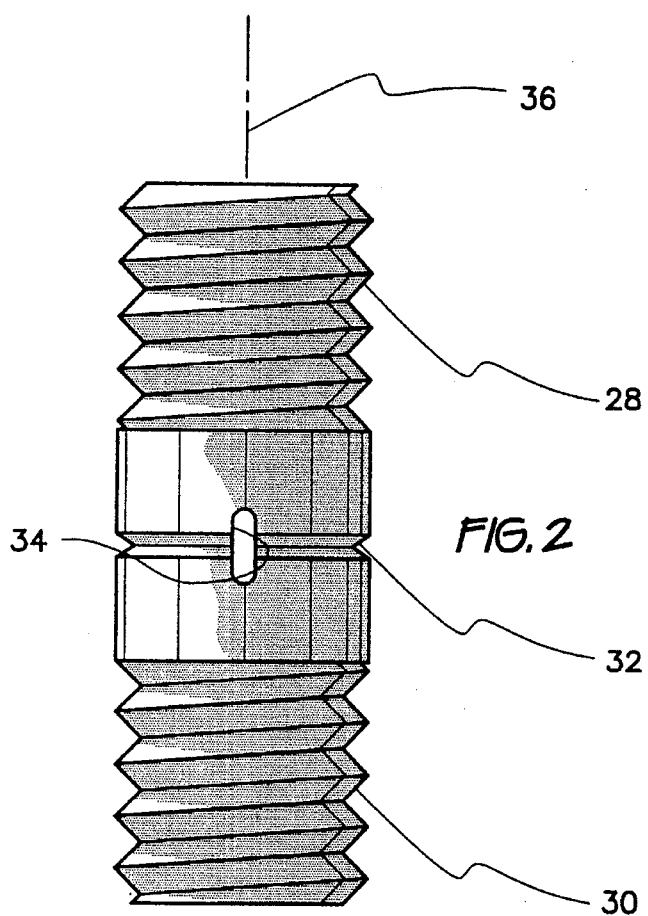
FIG. 2 is a side elevational detail view of the frangible joint.

Referring next to FIG. 2, tube 26 is illustrated in its whole, unbroken condition. Threads 28,30 are located at the two ends of tube 26. The center section of tube 26 is intentionally weakened by inscribing a score or an incision 32 about the circumference of tube 26, and also by forming one or more penetrations 34 entirely through tube 26.

Incision 32 and penetration 34 cause tube 26 to have a predetermined strength less than that of neck 18, so that a shearing force applied to neck 18 will cause frangible joint 20 to break prior to any other point along neck 18. A shearing force is any force that acts normal to neck 18, or pulls axially on neck 18, thus urging neck 18 to break into two pieces.

Figure 3:
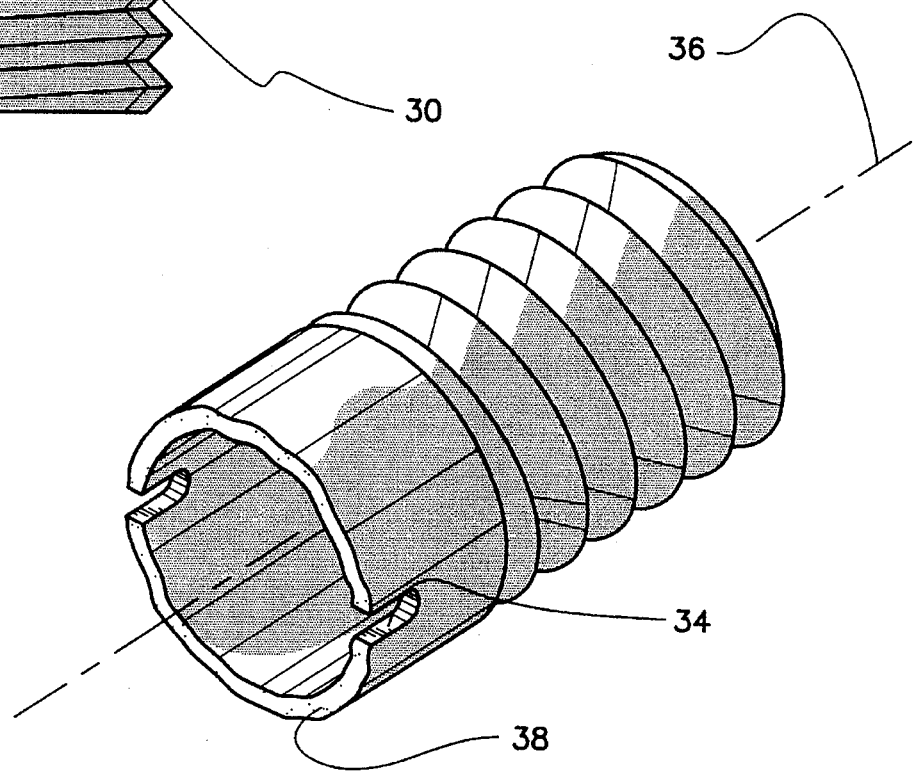
FIG. 3 is a perspective detail view of a portion of the frangible joint, shown after breakage.

With axis 36 serially aligned with neck 18 (see FIG. 1), as occurs normally, prior to a collision, tube 26 will break cleanly into two sections. One such section is depicted in FIG. 3. Fracture occurs in a plane normal to axis 36, leaving the broken section with a roughened surface 38 at the plane of fracture. However, sharp projections, splinters, and shards that could otherwise aggravate injury and damage are avoided.

It is possible that rough treatment will cause frangible joint 20 to break, or that a collision will have the same result. It is possible to renew joint 20 by replacing tube 26. To this end, removable manual connection of tube 26 to sockets 22,24 is provided by threads 28,32, there being cooperating threads formed in sockets 22,24.

Another advantage of penetrations 34 is that after fracture of joint 20, penetrations 34 may be engaged by a tool (not shown), such as a screwdriver blade, for unthreading the broken section of tube 26 from its socket or 24.

In the event of a collision, it is possible that cradle 12, possibly together with a bottle 14 and part of neck 18, will fly about the cabin of an automobile, thus creating an additional hazard. This eventuality is forestalled optionally by provision of a flaccid tether 40. Tether 40 is connected to each section of neck 18, preferably at and externally to sockets 22,24. Tether 40 is thus arranged in parallel with joint 20, and is of sufficient length that it plays no role until joint 20 is fractured. After fracture, tether 40 restrains cradle 12, bottle 14, and a portion of neck 18 from being thrown about an automobile.

Of course, many variations and modifications may be made to the invention. For example, weakening provided by incision 32 and penetration 34 may be provided by other methods, such as adhering two sections together with a bond of predetermined strength less than that of neck 18. If provided, incision 32 may be located at the inside circumference of tube 26.

Also, the exact location of frangible joint 20 may be located as desired. In a further example, cradle 12 may be functionally provided by a resilient socket, or in still other forms. Clamp 16 may comprise mating hook and loop patches, or still other types of attachment. Neck 18 may be formed from a rod of material having requisite partial or even complete rigidity.

It is to be understood that the present invention is not limited to the embodiments described above, but encompasses any and all embodiments within the scope of the following claims.

I claim:

1. A bottle holder for maintaining a bottle in place proximate and accessible to a feeding child, said bottle holder comprising:

a cradle and means for engaging a bottle and securing the bottle within said cradle;

a clamp for releasably engaging an environmental surface; and a partially rigid neck connecting said clamp to said cradle, said partially rigid neck including a frangible joint and a remaining length, said frangible joint being of predetermined strength of less magnitude of the strength of said remaining length of said partially rigid neck, whereby a shearing force applied to said partially rigid neck will cause said partially rigid neck to break at said frangible joint, said frangible joint comprising a tube having first threads and second threads, said partially rigid neck including third threads cooperating with said first threads of said frangible joint and fourth threads cooperating with said second threads of said frangible joint, whereby said frangible joint is disposed serially within said partially rigid neck and is connected to said partially rigid neck by mutual threading.

2. The bottle holder according to claim 1, said frangible joint having means for making manual connection to said partially rigid neck, whereby a broken frangible joint is renewed by manually removing the broken frangible joint and manually installing a new frangible joint.

3. The bottle holder according to claim 1, further comprising a flaccid tether disposed in parallel with said frangible joint, whereby said cradle is restrained from being thrown about an automobile in the event of breakage of said frangible joint.

4. The bottle holder according to claim 1, said frangible joint comprising a tube having an axis, an outer circumference, and a break line formed by scoring said tube about said outer circumference, said axis of said tube disposed serially with said partially rigid neck, whereby said frangible joint breaks into two pieces devoid of sharp projections.

5. A bottle holder for maintaining a bottle in place proximate and accessible to a feeding child, said bottle holder comprising:

a cradle and means for engaging a bottle and securing the bottle to said cradle;

a clamp for releasably engaging an environmental surface;

a partially rigid neck connecting said clamp to said cradle, said partially rigid neck including a tubular frangible joint and a remaining length, said tubular frangible joint being of predetermined strength of less magnitude of the strength of said remaining length of said partially rigid neck, whereby a shearing force applied to said partially rigid neck will cause said partially rigid neck to break at said tubular frangible joint, said frangible joint having means for making manual connection to said partially rigid neck, whereby a broken tubular frangible joint is renewed by manually removing the broken tubular frangible joint and manually installing a new tubular frangible joint; and a flaccid tether disposed in parallel with and externally to said tubular frangible joint, whereby said cradle is restrained from being thrown about an automobile in the event of breakage of said tubular frangible joint.

6. The bottle holder according to claim 5, said frangible joint comprising a tube having an axis, an outer circumference, and a break line formed by scoring said tube about said outer circumference, said axis of said tube disposed serially with said partially rigid neck, whereby said frangible joint breaks into two pieces devoid of sharp projections.

7. A bottle holder for maintaining a bottle in place proximate and accessible to a feeding child, said bottle holder comprising:

a cradle and means for engaging a bottle and securing the bottle to said cradle;

a clamp for releasably engaging an environmental surface;

a partially rigid neck connecting said clamp to said cradle, said partially rigid neck including a frangible joint and a remaining length, said frangible joint comprising a tube having first threads and second threads, said partially rigid neck including third threads cooperating with said first threads of said frangible joint and fourth threads cooperating with said second threads of said frangible joint, whereby said frangible joint is disposed serially within said partially rigid neck and is connected to said partially rigid neck by mutual threading, said tube having means defining a circumferential incision and means defining a penetration through said frangible joint, whereby said frangible joint has a predetermined strength of less magnitude of the strength of said remaining length of said partially rigid neck, whereby a shearing force applied to said partially rigid neck will cause said partially rigid neck to break at said frangible joint; and a flaccid tether disposed in parallel with and externally to said frangible joint, whereby said cradle is restrained from being thrown about an automobile in the event of breakage of said frangible joint.

* * * * *